United States Patent
Beck

(10) Patent No.: US 6,648,309 B2
(45) Date of Patent: Nov. 18, 2003

(54) SELF-PUMPING HYDROPNEUMATIC SUSPENSION STRUT WITH INTERNAL RIDE-HEIGHT CONTROL

(75) Inventor: Hubert Beck, Eitorf (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/061,994

(22) Filed: Feb. 1, 2002

(65) Prior Publication Data

US 2002/0105118 A1 Aug. 8, 2002

(30) Foreign Application Priority Data

Feb. 1, 2001 (DE) .......................................... 101 04 358

(51) Int. Cl.⁷ .......................... F16F 09/14; F16F 09/32; F16F 09/43; B60G 09/04
(52) U.S. Cl. .............................. 267/64.17; 267/DIG. 2; 188/322.21; 188/300; 280/124.159
(58) Field of Search ........................... 267/64.17, 64.16, 267/218, DIG. 1, DIG. 2; 188/315, 318, 322.16, 322.17, 352, 285, 286, 287, 289, 322.21, 300, 322.19, 297, 298; 280/DIG. 1, 5.514, 124.16, 124.161, 124.159

(56) References Cited

U.S. PATENT DOCUMENTS

| | | | | | |
|---|---|---|---|---|---|
| 3,033,556 A | * | 5/1962 | Wossner | .................. | 267/64.19 |
| 3,391,922 A | * | 7/1968 | Axthammer | ............. | 267/64.17 |
| 3,480,269 A | * | 11/1969 | Jewell et al. | ............. | 267/64.17 |
| 3,497,199 A | * | 2/1970 | Tuczek | .................... | 267/64.17 |
| 3,658,313 A | * | 4/1972 | Hahn | ..................... | 267/64.17 |
| 3,892,424 A | * | 7/1975 | Takahashi et al. | ........ | 267/64.16 |
| 3,951,392 A | * | 4/1976 | de la Faille | ................ | 267/218 |
| 4,345,748 A | * | 8/1982 | Wossner et al. | ........ | 188/322.17 |
| 4,624,346 A | * | 11/1986 | Katz | ........................ | 188/282.9 |
| 4,993,693 A | * | 2/1991 | Lohr et al. | ............. | 188/322.14 |
| 5,564,680 A | * | 10/1996 | Sano et al. | ............... | 267/64.17 |
| 5,857,665 A | * | 1/1999 | Beck | ..................... | 188/322.14 |
| 6,032,933 A | * | 3/2000 | Beck | .......................... | 188/289 |
| 6,062,352 A | * | 5/2000 | Shinozaki et al. | ..... | 188/322.16 |

FOREIGN PATENT DOCUMENTS

| | | | |
|---|---|---|---|
| DE | 3318939 A1 | * | 11/1984 |
| DE | 19648859 A1 | * | 5/1998 |
| DE | 19835222 A1 | * | 2/1999 |
| EP | 02999949 A2 | * | 1/1989 |
| GB | 2035511 A | * | 6/1980 |

* cited by examiner

Primary Examiner—Christopher P. Schwartz
Assistant Examiner—Melody M. Burch
(74) Attorney, Agent, or Firm—Cohen, Pontani, Lieberman & Pavane

(57) ABSTRACT

Self-pumping hydropneumatic suspension strut with internal ride-height control, particularly for motor vehicles, with an outer tube with an oil-filled high-pressure work space under the pressure of at least one gas cushion acting as spring in a high-pressure chamber, a second work space on the piston rod side, and an axially displaceable piston which is supported by a hollow piston rod and is sealed in the work cylinder. The piston rod which is driven by the springing movement of the vehicle conveys oil from a low-pressure chamber to the second work space connected to the high-pressure chamber and a pump rod is received in a pump cylinder formed by the hollow piston rod. The high-pressure chamber is connected with a flow connection arranged in the piston rod guide, wherein a filling bore hole arranged in the outer tube communicates with the flow connection when the piston rod guide is not completely mounted, and the filling bore hole is closed by the piston rod guide after the piston rod guide slides axially into the outer tube.

8 Claims, 8 Drawing Sheets

SELF-PUMPING HYDROPNEUMATIC SUSPENSION STRUT WITH INTERNAL RIDE-HEIGHT CONTROL

BACKGROUND OF THE INVENTION

1. Field of the Invention

The invention is directed to a self-pumping hydropneumatic spring leg or suspension strut with internal level or ride-height control, particularly for motor vehicles, with an outer tube with an oil-filled high-pressure work space in the work cylinder under the pressure of at least one gas cushion acting as spring in a high-pressure chamber, a second work space on the piston rod side, and an axially displaceable piston which is supported by a hollow piston rod and is sealed in the work cylinder. The piston rod which is driven by the springing movement of the vehicle, conveys oil from a low-pressure chamber to the work space connected to the high-pressure chamber and comprises a pump rod and a pump cylinder formed by the hollow piston rod.

2. Description of the Related Art

Self-pumping hydropneumatic suspension struts with internal ride-height control are already known (e.g., DE 196 48 859 C2), wherein the suspension strut must usually travel a substantially shorter path than the vehicle wheel due to the articulation in the vehicle. This results in a short construction with a large outer diameter.

U.S. Pat. No. 5,797,594 discloses a suspension strut in which no separation is provided in the high-pressure space between the oil and the high-pressure gas, so that the changes in spring gas volume caused by pressure and temperature lead to unacceptable changes in spring force.

Further, pressure vessels for enclosing a gas mass are known (e.g., DE 198 35 222 A1) in which the gas mass enclosed by an oil body which changes in shape is pretensioned. The wall of the enveloping body is formed at least partially from a gastight barrier layer and the wall is constructed in multiple layers.

In one direction of development taken in automotive engineering, the wheel path is in a ratio of about 1:1 to the path of the suspension strut. This means that suspension struts are provided which have small diameters, but have a corresponding length. Suspension struts with small diameters are required whenever it is desirable to have a reasonable width of the back loading space for the trunk of a vehicle.

According to the suspension strut (e.g., DE 196 48 859 C2), the device cannot be lengthened to any extent desired and the diameter can not be reduced to any extent desired because this would require a diaphragm or membrane for separating the high-pressure gas in a correspondingly long construction. Since the elastic membrane allows corresponding gas diffusion over the course of its service life, an overlong membrane would accelerate this gas diffusion. Further, there is no conducting of heat from the oil at the outer tube of the suspension strut because the gas between the outer tube and work cylinder brings about an insulating effect.

SUMMARY OF THE INVENTION

It is the object of the invention to provide a self-pumping hydropneumatic suspension strut with internal ride-height control in which smaller outer diameters can be produced with a correspondingly greater length of the suspension strut. In this regard, not only can a sufficient volume of gas be received in the high-pressure chamber, but adequate cooling of the oil can also be retained.

According to the invention, this object is met in that the high-pressure chamber is connected with a flow connection arranged in the piston rod guide, wherein a first filling bore hole arranged in the outer tube communicates with the flow connection when the piston rod guide is not completely assembled, and in that the filling bore hole is closed by the piston rod guide after the piston rod guide slides axially into the outer tube. In this regard, it is advantageous that the necessary internal parts, e.g., the high-pressure chamber, the piston, the piston rod and the pump rod, together with the piston rod guide, are introduced axially into the outer tube of the suspension strut and that the suspension strut is operational after filling at least the high-pressure chamber with pressure gas via the filling bore hole, and that after the piston rod guide is slid in farther axially together with the work cylinder and the rest of the internal parts the filling bore hole is closed by the piston rod guide, so that the suspension strut is completely assembled after the outer tube has been flanged.

In order to achieve adequate cooling of the oil, it is provided according to another feature that an enveloping body which changes in shape and whose wall comprises a gastight barrier layer is provided as high-pressure chamber. The advantage in this regard consists in that the high-pressure chamber in the form of an enveloping body can be arranged concentrically between the outer tube and the work cylinder and the oil in the suspension strut can reach the area of the inner wall of the outer tube in order to give off its heat to the atmosphere via the outer tube.

According to another essential feature, the enveloping body has a connection element which is received in an opening of the flow connection. It is advantageous that the high-pressure chamber in the form of the enveloping body is received in the opening of the flow connection in the manner of a plug-in connection. There is a frictional engagement and/or positive engagement between the connection element of the enveloping body and the piston rod guide.

According to another construction, the enveloping body is provided in the area of a connection element with a check valve. The advantage in this regard consists in that the pressure gas introduced into the enveloping body can not readily escape again.

According to another feature, the low-pressure chamber communicates with a second filling bore hole arranged in the outer tube when the intermediate base or piston rod guide is not completely mounted and, after the intermediate base or piston rod guide slides axially into the outer tube, the second filling bore hole is closed by the intermediate base or the piston rod guide.

Faultless sealing is ensured in that the piston rod guide or the intermediate base has a seal in the area adjoining the filling bore hole.

According to another essential feature, the high-pressure chamber arranged between the work cylinder and the outer tube is surrounded by oil.

It is ensured that the internal parts which are joined together as a constructional unit are fixed in a simple manner with respect to manufacturing in that the outer tube is provided for supporting an intermediate base with partial indentations which are arranged from the radial outer side to the radial inner side or in that the outer tube is provided with a circumferentially extending flange or bead which is pressed in radially, an intermediate base contacting the bead in the interior of the outer tube.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
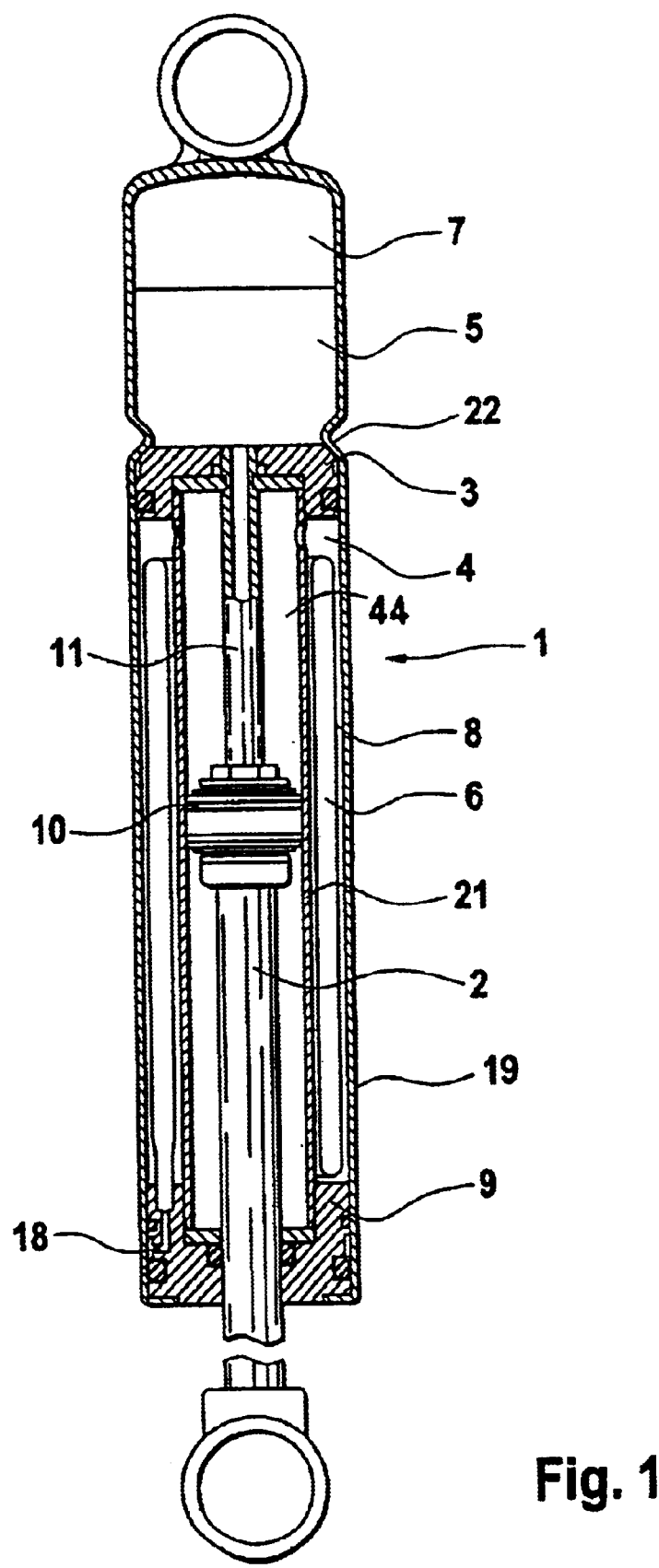
FIG. 1 is an axial cross-section of a first embodiment of suspension strut according to the invention.

FIG. 1 shows a self-pumping hydropneumatic suspension strut 1 with internal ride-height control in which the piston 10 is arranged in the work cylinder 21 and fastened by a piston rod 2. The piston rod 2 is guided downward out of the outer tube 19 along the piston rod guide 9. The pump rod 11 is fastened to an intermediate base 3, wherein the pump rod 11 penetrates into the hollow space of the piston rod 2 and these structural component parts together form the actual piston pump. The intermediate base 3 separates the high-pressure chamber 6 from the low-pressure chamber 5 and the gas cushion in the high-pressure chamber 6 is associated with the first work space 4 on the high-pressure side, while the low-pressure chamber 5 accommodates the gas volume 7 and is connected to the second work space 44, the first and second work spaces being connected by a passage 40 through the work cylinder 21.

An enveloping body 8 which communicates with the flow connection 18 is provided as a high-pressure chamber 6.

Figure 2:
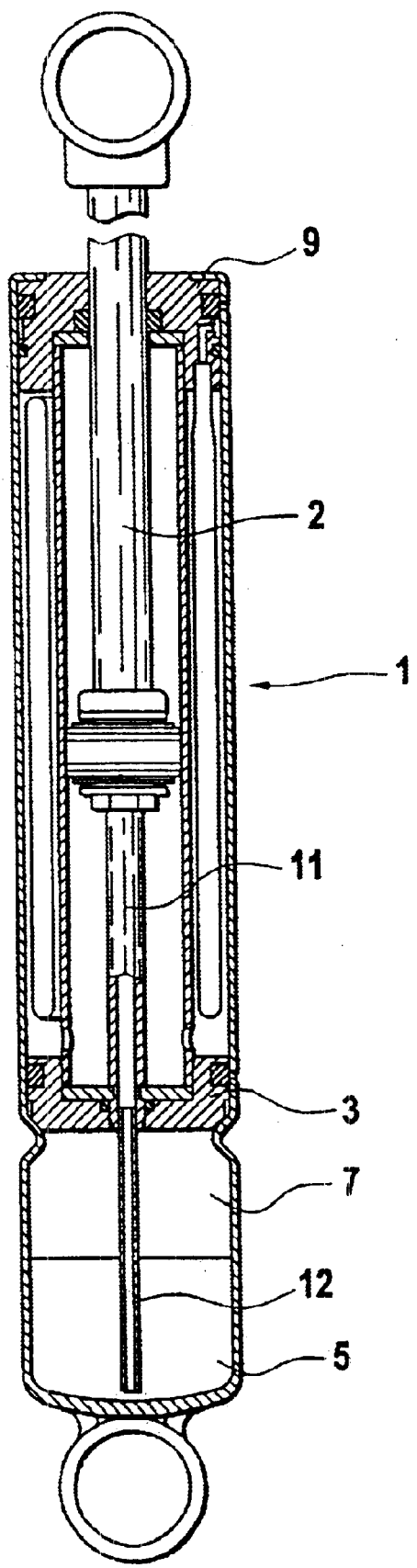
FIG. 2 is a cross-section of a second embodiment which is oppositely mounted.

FIG. 2 shows a suspension strut 1 in which the piston rod 2 is guided out of the piston rod guide 9 upward toward the surrounding air. The pump rod 11 is again fixed to the intermediate base 3, but a suction tube 12 is needed to reach the oil in the low-pressure chamber 5 through the gas volume 7 of the low-pressure chamber.

Figure 3:
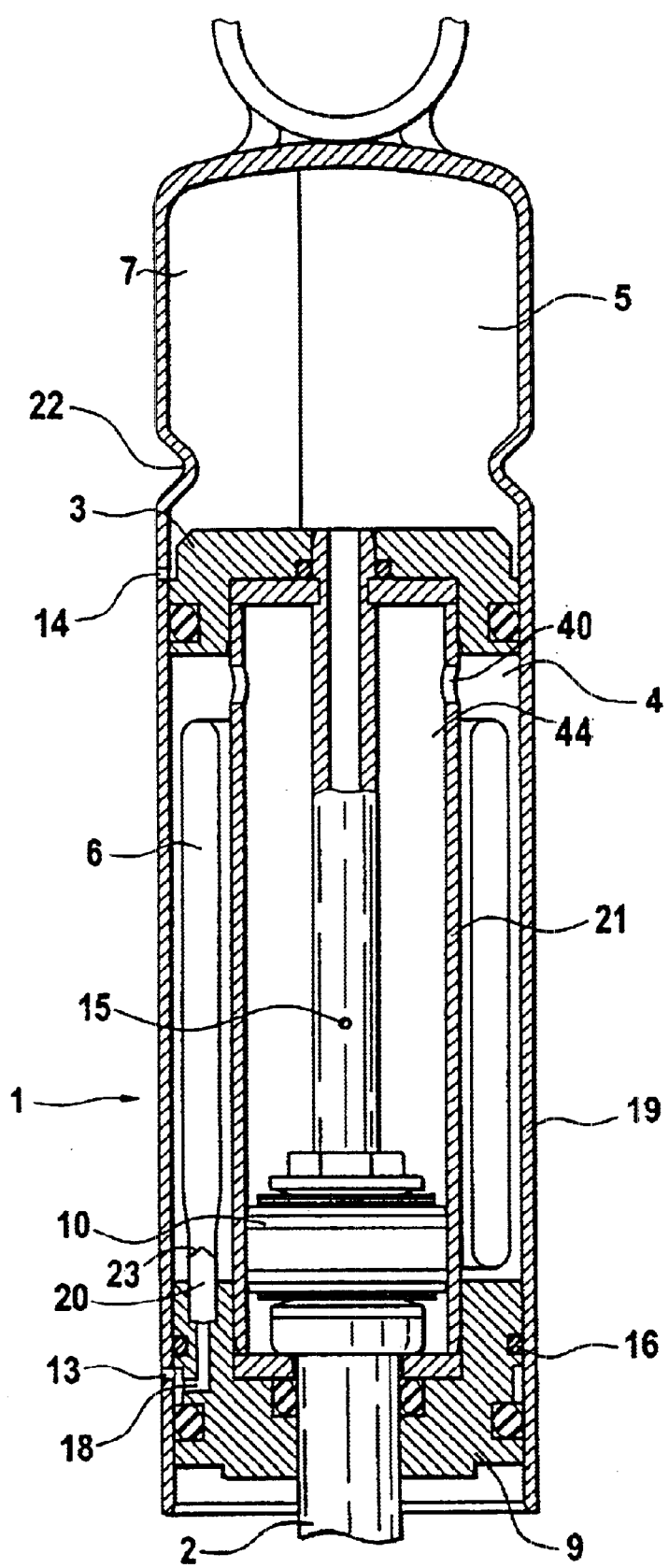
FIG. 3 is a cross-section of the first embodiment at the gas-filling stage of assembly.
Figure 4:
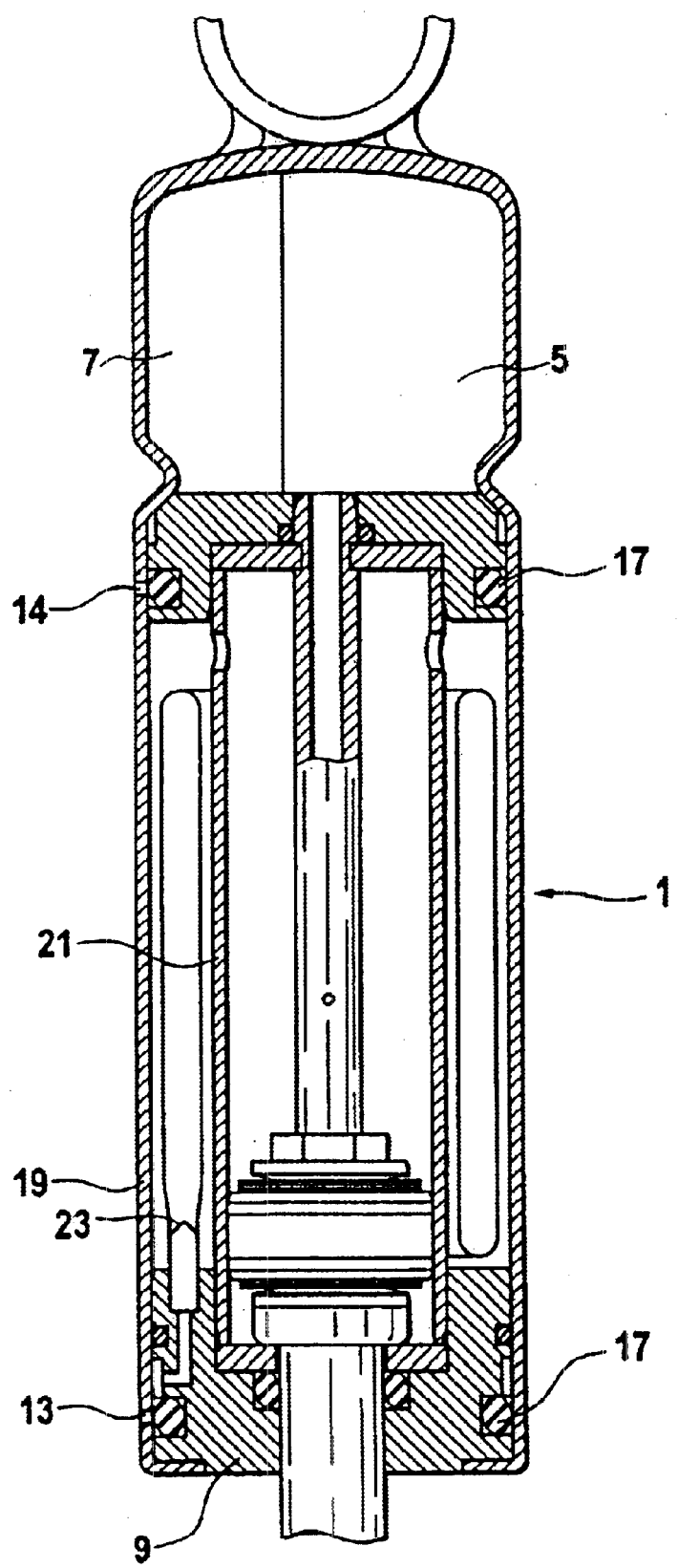
FIG. 4 is a cross-section of the first embodiment following the gas-filling stage of assembly.

FIGS. 3 and 4 show the assembly of the suspension strut 1 in two steps. Starting with FIG. 3, the outer tube 19 is constructed so as to be open in its lower area, while the indentations 22 serve as a stop for the intermediate base 3 in the upper area. Alternatively, a circumferentially extending inwardly formed radial bead 22 may serve as the stop. In the position shown in FIG. 3, the internal parts, namely, the intermediate base 3, the work cylinder 21, the piston 10, the piston rod 2 and the high-pressure chamber 6, have been inserted axially into the outer tube 19 in such a way that the seal 16 has passed the first filling bore hole 13 axially, while the seal 17 seals the piston rod guide 9 relative to the outside. In this position, the filling bore hole 13 is connected with the high-pressure chamber 6 via the flow connection 18 and connection element 20 of enveloping body 8, while the low-pressure chamber 5 communicates with the second filling bore hole 14. A check valve 21 is shown symbolically in the connection element 20. After the pressure gas is introduced into the low-pressure chamber 5 and high-pressure chamber 6 via the filling bore holes 13 and 14, the piston rod guide 9, as is shown in FIG. 4, is displaced axially further in the direction of the outer tube 19, so that the seals 17 of the piston rod guide 9 and intermediate base 3 close the filling bore holes 13 and 14. Subsequently, the outer edge of the outer tube 19 is formed radially inward to the piston rod guide 9 and the suspension strut is closed so as to be tight against gas. The seal 16 is provided in order to prevent oil from penetrating into the high-pressure chamber 6 from the work space 4 between the inner wall of the outer tube 19 and the outer wall of the piston rod guide 9. Note that the strut 1 is oriented horizontally while the chamber 5 is being filled with gas; the vertical line in chamber 5 in FIGS. 3 and 4 represents the surface of the oil.

As is conventional, the outlet bore hole 15 serves for path-dependent pressure equalization between the work space 44 and the low-pressure chamber 5 so that the vehicle body reaches its standing height in the unloaded state.

Figure 5:
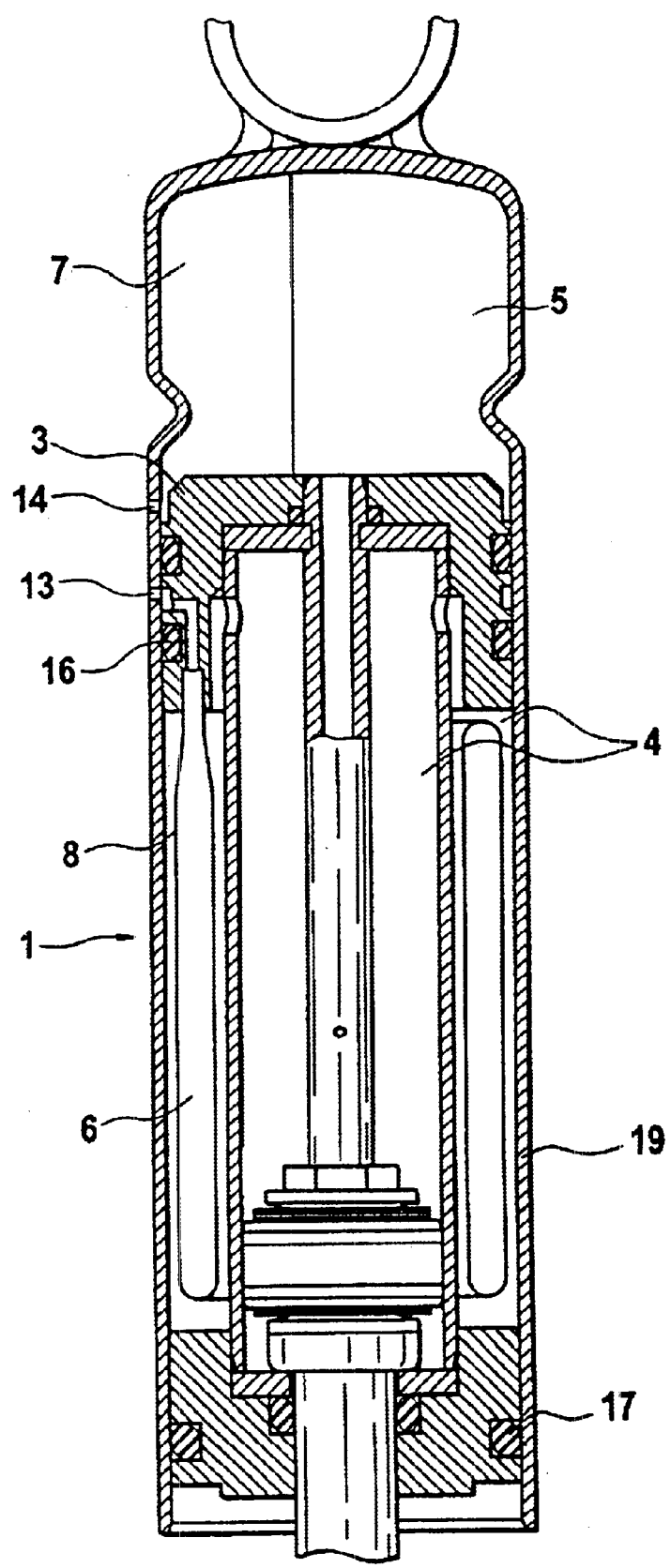
FIG. 5 is a cross-section of a third embodiment at the gas-filling stage of assembly.
Figure 6:
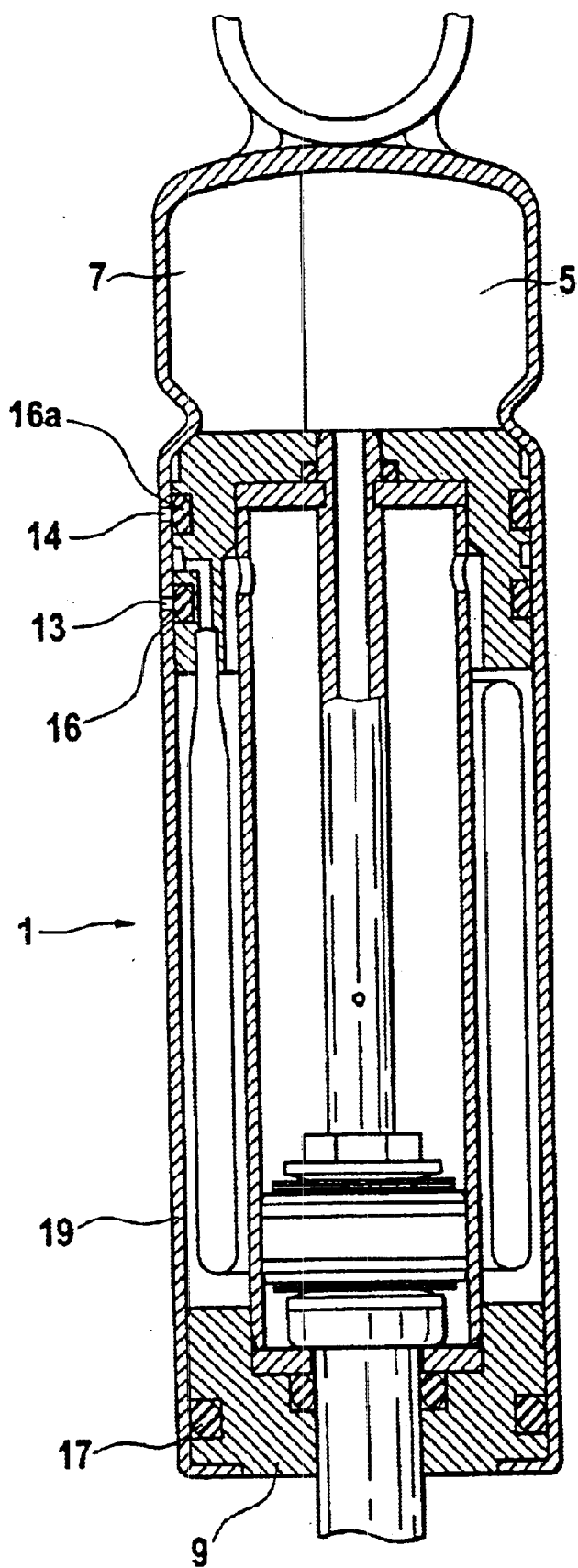
FIG. 6 is a cross-section of the third embodiment following the gas filling stage of assembly.

FIGS. 5 and 6 show another embodiment form in which the filling bore holes 13 and 14 open into the low-pressure chamber 5 and high-pressure chamber 6, respectively, in the outer tube 19 in the mounted state shown in FIG. 5. FIG. 6 shows the completely mounted state, wherein the seals 16 and 16a close the filling bore holes 14 and 13. The outer tube 19 is closed off from the atmosphere relative to the piston rod guide 9 by means of seal 17. In other respects, the principle corresponds to FIGS. 5 and 6 and the versions of FIGS. 3 and 4 which have already been described.

Figure 7:
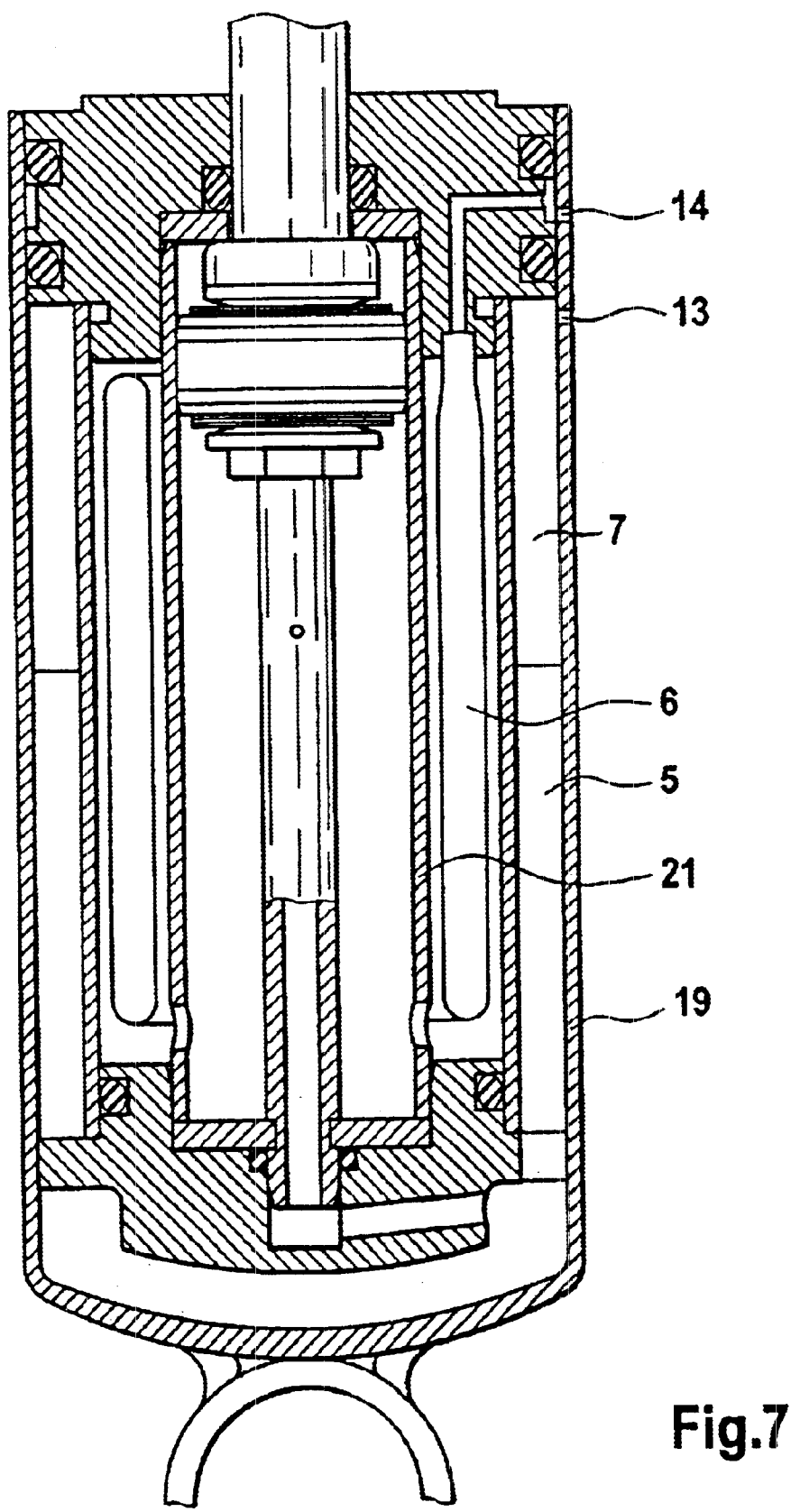
FIG. 7 is a cross-section of a fourth embodiment at the gas-filling stage of assembly.
Figure 8:
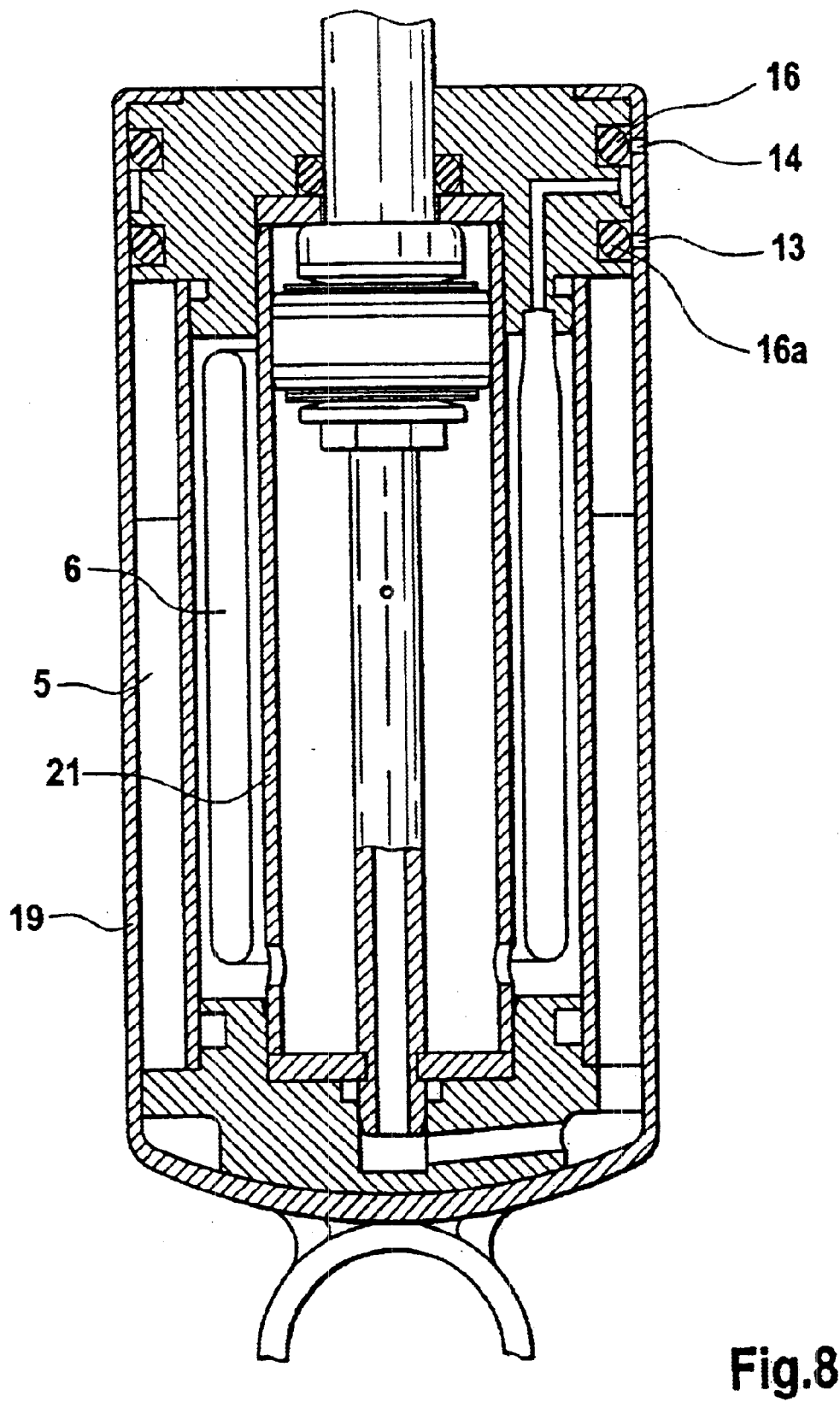
FIG. 8 is a cross-section of the fourth embodiment following the gas-filling stage of assembly.

FIGS. 7 and 8 show an embodiment form in which the low-pressure space 5 is arranged concentrically outside the high-pressure chamber 6, wherein the high-pressure chamber 6 is arranged between the work cylinder 21 and the outer tube 19. The filling bore hole 13 constitutes a connection, according to FIG. 7, to the low-pressure chamber and filling bore hole 14 is a connection to the high-pressure chamber 6.

According to FIG. 8, a sealing of the bore holes 13 and 14 is ensured in the completely mounted state by seals 16 and 16a. The principle of the actual suspension strut corresponds to the embodiment example shown in FIG. 1.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A self-pumping hydropneumatic suspension strut with internal ride height control, said strut comprising:
   an outer tube having a first filling bore hole and a second filling bore hole,
   an intermediate base received in said outer tube, said second filling bore hole being closed by said intermediate base when said intermediate base is fully received in said outer tube,
   a work cylinder located concentrically inside said outer tube,
   a first work space between said outer tube and said work cylinder, said first work space having therein a high pressure chamber comprising an enveloping body having a deformable wall containing a gas which forms at least one gas cushion acting as a spring,
   an axially displaceable piston sealed in said work cylinder and defining a second work space connected to said first work space through said work cylinder,
   a low pressure chamber containing oil, said low pressure chamber communicating with said second filling bore hole when said intermediate base is not fully received in said outer tube,
   a hollow piston rod which supports said axially displaceable piston,
   a pump rod received in a pump cylinder formed by said piston rod, said piston rod connecting said second work space to said low pressure chamber, and
   a piston rod guide fitted in said outer tube and receiving said piston rod therethrough, said piston rod guide having formed therein a flow connection connected to said at least one gas cushion in said high pressure chamber, said flow connection communicating with said first filling bore hole while said piston rod guide is not fully received in said outer tube, said first filling bore hole being closed by said piston rod guide when said piston rod guide is fully received in said outer tube.

2. A suspension strut as in claim 1 wherein the enveloping body has a connection element which communicates with said flow connection.

3. A suspension strut as in claim 1 further comprising a check valve in said connection element of said enveloping body.

4. A suspension strut as in claim 1 wherein said intermediate base comprises a seal which seals said second filling bore hole when said intermediate base is fully received in said outer tube.

5. A suspension strut as in claim 1 wherein said piston rod guide comprises a seal which seals said first filling bore hole when said piston rod guide is fully received in said outer tube.

6. A suspension strut as in claim 1 wherein said first work space is filled with oil surrounding said at least one gas cushion.

7. A suspension strut as in claim 1 wherein said outer tube is provided with radial indentations for supporting said intermediate base received in said outer tube.

8. A suspension strut as in claim 1 wherein said outer tube is provided with a circumferentially extending inwardly formed radial bead for supporting said intermediate base received in said outer tube.

* * * * *